Patented Aug. 18, 1936

2,051,184

UNITED STATES PATENT OFFICE 2,051,184

ADHESIVE

Walther Schrauth, Berlin-Dahlem, Germany

No Drawing. Application October 24, 1933, Serial No. 695,050. In Germany October 24, 1932

10 Claims. (Cl. 134—23.1)

The present invention relates to adhesives of various types including those made from starch, dextrine, natural gums and animal matter, and has for an object to provide improved adhesives having more effective adhesive properties.

A further object is to provide adhesives which are less subject to mold and other deteriorating influences.

It has been discovered in accordance with the present invention that the addition of certain higher molecular alcohols or sulfates or sulfonates of these alcohols or mixtures of alcohol and sulfates or sulfonates improves the quality of the adhesive in several respects. It increases the spreading and penetrating properties and the adhesive strength.

The presence of the alcohols and/or their sulfuric acid reaction products improves the swelling properties of the starch grains and glue materials and makes it possible to produce the adhesives without heating to a temperature which tends to deteriorate the quality of the material.

Sulfates and sulfonates of the alcohols, and perhaps also the alcohols themselves, have an antiseptic effect which makes the adhesives more stable and resistant to mold and other deterioration.

The alcohols may be the aliphatic and cyclo-aliphatic alcohols containing 8 or more carbon atoms in the molecule and including the saturated and unsaturated alcohols, and the naphthene alcohols. Especially suitable are the primary mono-hydric and di-hydric alcohols having 8 to 18 carbon atoms in the molecule, such as the lauryl, myristyl, cetyl, stearyl, oleyl and ricinoleyl alcohols. The sulfates or sulfonates may be those of the above alcohols including the sulfuric acid esters and the true sulfonic acids neutralized with the alkali metal or alkaline earth salts or with ammonia or other organic bases.

The alcohols may be obtained from the natural fats and waxes, such, for example, as the castor oil, coconut oil, sperm oil, wool fat or tallow or other esters or from fatty acids by hydrogenation at temperatures of 200 to 400° C. and under pressure of 50 to 500 atmospheres in the presence of a hydrogenation catalyst and the sulfuric acid esters and the sulfonates may be produced from these alcohols by treatment with sulfuric acid, fuming sulfuric acid or chlorosulfonic acid at various temperatures either below zero centigrade or at temperatures well above 50° C. depending upon the particular products found preferable for use in the particular adhesive and by following neutralization. The sulfuric acid esters or the sulfonic acids may be those having one or more sulfur containing radicals in the molecule.

The improved adhesive may contain a mixture of one or more alcohols with one or more sulfates or sulfonates. The roportion may vary, for example, between ¼% and 5% alcohol with ¼% to 5% sulfuric acid esters in a starch adhesive, but ordinarily 1 to 3% of the total addition is preferred. In glue the proportion of the alcohol and the sulfuric acid reaction products (sulfates and/or sulfonates) should be perhaps from 0.1% to 3%. Adhesives prepared from natural gum such as gum arabic, tragacanth, cherry gum, or the like, may contain, for example, 0.1% to 3% of a mixture of a high molecular alcohol and a sulfate.

Example 1

0.5% lauryl alcohol is added to aqueous solution of bone glue before or during the process of manufacture of the glue and while it is slightly heated to facilitate the dispersion of the alcohol. The alcohol improves the tensile strength of the glue.

Example 2

Approximately 1 to 3% of the sodium salt of cetyl alcohol sulfonate is added to a potato starch paste during the course of preparation. The starch paste can be more quickly prepared as the result of the presence of the sulfonate and it can be used for weeks without the formation of mold.

Example 3

The tensile strength of an adhesive made from gum arabic is improved by the addition of 2% of a mixture of equal parts naphthene alcohol and oleyl alcohol sulfonate.

I claim:

1. An adhesive of the type of glue, starch, dextrine and natural gums having dispersed therein an alcohol of the group consisting of the aliphatic and cyclo-aliphatic saturated and unsaturated alcohols having 8 or more carbon atoms in the molecule and naphthene alcohols, together with a reaction product of sulfuric acid and one of the alcohols of the above group, the alcohol and the sulfuric acid reaction product together constituting of the order of ½ to 5% of the total composition.

2. An adhesive of the type of glue, starch, dextrine and natural gums having dispersed therein a normal primary alcohol containing from 8 to 18 carbon atoms and an alkali sulfate salt of a normal primary alcohol containing from 8 to 18 carbon atoms, the alcohol and sulfated alcohol together constituting about ½% to about 5% of the total composition.

3. An adhesive of the type of glue, starch, dextrine and natural gums having dispersed therein a normal primary alcohol containing from 8 to 18 carbon atoms and an alkali sulfate salt of a normal primary alcohol containing from 12 to 18 carbon atoms, the alcohol and sulfated alcohol together constituting about ½% to about 5% of the total composition.

4. An adhesive of the type of glue, starch, dextrine and natural gums having dispersed therein a normal primary alcohol containing from 8 to 18 carbon atoms and a sodium sulfate salt of a normal primary alcohol containing from 12 to 18 carbon atoms, the alcohol and sulfated alcohol together constituting about ½% to about 5% of the total composition.

5. Glue having dispersed therein a normal primary alcohol containing from 8 to 18 carbon atoms and a sodium sulfate salt of a normal primary alcohol containing from 12 to 18 carbon atoms, the alcohol and sulfated alcohol together constituting about ½% to about 5% of the total composition.

6. Starch paste having dispersed therein a normal primary alcohol containing from 8 to 18 carbon atoms and a sodium sulfate salt of a normal primary alcohol containing from 12 to 18 carbon atoms, the alcohol and sulfated alcohol together constituting about ½% to about 5% of the total composition.

7. Natural gum adhesives having dispersed therein a normal primary alcohol containing from 8 to 18 carbon atoms and a sodium sulfate salt of a normal primary alcohol containing from 12 to 18 carbon atoms, the alcohol and sulfated alcohol together constituting about ½% to about 5% of the total composition.

8. An adhesive consisting of a solution of a natural gum and approximately 2% of a mixture of substantially equal parts of naphthene alcohol and oleyl alcohol sulfonate.

9. An adhesive of the type of glue, starch, dextrine and natural gums having dispersed therein a normal primary alcohol containing from 8 to 18 carbon atoms and an alkali sulfate salt of cetyl alcohol, the alcohol and sulfated alcohol together constituting about ½% to about 5% of the total composition.

10. An adhesive of the type of glue, starch, dextrine and natural gums having dispersed therein a normal primary alcohol containing from 8 to 18 carbon atoms and the sodium sulfate salt of cetyl alcohol, the alcohol and sulfated alcohol together constituting about ½% to about 5% of the total composition.

WALTHER SCHRAUTH.